United States Patent
Laussermair

[11] 3,844,730
[45] Oct. 29, 1974

[54] PROCESS FOR THE MANUFACTURE OF A ROTOR OR SHAFT OF LOW DEFORMABILITY

[75] Inventor: Friedrich Laussermair, Munich, Germany

[73] Assignee: Maschinenfabrik Augsburg-Nurnberg Aktiengesellschaft

[22] Filed: Aug. 19, 1971

[21] Appl. No.: 173,036

Related U.S. Application Data
[62] Division of Ser. No. 822,492, May 7, 1969, abandoned.

[30] Foreign Application Priority Data
May 10, 1968 Germany............................ 1750523

[52] U.S. Cl........................ 29/446, 29/421, 29/523, 64/1 R
[51] Int. Cl............................................. B23p 11/02
[58] Field of Search ............. 29/446, 523, 421, 404; 64/1

[56] References Cited
UNITED STATES PATENTS
| | | | |
|---|---|---|---|
| 2,109,937 | 3/1938 | Trbojevich | 64/1 |
| 3,023,495 | 3/1962 | Noland | 29/446 X |

FOREIGN PATENTS OR APPLICATIONS
| | | | |
|---|---|---|---|
| 627,255 | 8/1949 | Great Britain | 64/1 |

*Primary Examiner*—Charlie T. Moon
*Attorney, Agent, or Firm*—Craig & Antonelli

[57] ABSTRACT

A process for the manufacture of a rotor or shaft of low deformability, suitable for high peripheral speeds which involves the steps of disposing a metallic cylinder of a high specific modulus of elasticity on the inside of a fibre-reinforced plastic cylinder of a low specific modulus of elasticity and building up an internal stress condition so that tangentially directed tensile stresses occur in the plastic cylinder and tangentially directed compressive stresses occur in the metallic cylinder, when in the rest condition, while tensile stresses occur by both cylinders at operating speed.

1 Claim, 2 Drawing Figures

PATENTED OCT 29 1974   3,844,730

INVENTOR
FRIEDRICH LAUSSERMAIR

BY Craig, Antonelli & Hill
ATTORNEYS

PROCESS FOR THE MANUFACTURE OF A ROTOR OR SHAFT OF LOW DEFORMABILITY

This is a Divisional Application of of Ser. No. 822,492 filed on May 7, 1969 now abandoned.

The present invention relates to rotating elements, and more particularly to rotating shafts and drums capable of operation at high speeds.

Cylindrical rotors are widely used in all fields of engineering. The permissive circumferential speed of a rotor is determined by its design and by the material used. A pure drum rotor, consisting essentially of a thin-walled cylinder, absorbs all the centrifugal forces during rotation by a system of tangential stresses.

When these tangential stresses exceed the permissive material stresses at an excessive rotational speed, then the rotor at first becomes unbalanced, due to uncontrollable plastic material deformations, or it fails after locally reaching its ultimate stress.

In addition to the permissive material stress, also the density of the material used plays an important role when high circumferential speeds are to be achieved. Materials with a high yield strength but with low density are capable of withstanding higher circumferential speeds than materials of higher density. Fiber-reinforced plastics, e.g., glass fiber-reinforced synthetic resinous materials, to be referred to as GFP, are known to have permissive stress values which are comparable to those of steel or titanium. Due to the density thereof which is less by about one-quarter, however, they are capable of withstanding higher circumferential speeds. However, rotors produced from fiber-reinforced plastics also entail considerable disadvantages which, up to now, have delayed their widespread application. The low modulus of elasticity of fiber-reinforced plastics leads to a high flexibility of such rotors and, in addition, to excessive expansion during rotation.

The present invention aims at producing a shaft or drum whose circumferential speed may be high with slight deformation.

To solve the underlying problem, the present invention proposes that a metal cylinder is arranged coaxially to a plastic cylinder and is combined with the same.

In this way a rotor will be produced, the wall thickness of which consists partially of a metal, e.g., steel, aluminum titanium, and partially of fiber-reinforced plastic (GFP). If this drum rotor is rotated at moderate speeds, then stresses and deformations will develop in the metal and in the plastic, which are interdependent according to a linear function. When the speed is increased, the stresses in the metal cylinder will rise more rapidly than those in the fiber-reinforced plastic, corresponding to the high modulus of elasticity of the metal. At a certain speed, the stresses in the metal part will reach the yield point. With a further speed increase, the inner metal cylinder will then be subject to plastic deformation, whereas increased elastic stresses will develop in the outer fiber-reinforced plastic cylinder. Thus, a shaft or drum is produced whose deformation is small, even at high circumferential speeds.

According to a further development and feature of the present invention, a metal cylinder of high rigidity is to be connected to a plastic cylinder of low rigidity, whereby the means specific weight of the complete cylinder is lower than the mean specific weight of a pure metal rotor of equal rigidity.

Accordingly, it is an object of the present invention to provide a rotating element of the type described above which avoids the shortcomings encountered in the prior art.

Another object of the present invention resides in a rotor element such as a shaft or drum which is capable of operating at relatively high speeds without failure.

A further object of the present invention resides in a combined speed or drum structure which is capable of operating at higher speeds than the normal safe operating speed of one of its components, while avoiding the undesirable properties inherent in the material of the other of the components.

These and further objects, features and advantages of the present invention will become more obvious from the following description when taken in connection with the accompanying drawing which shows, for purposes of illustration only, one embodiment in accordance with the present invention, and wherein.

Figure 1:
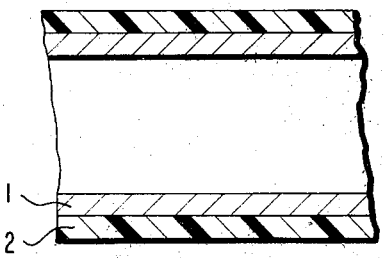
FIG. 1 is a partial, longitudinal axial cross-sectional view through one embodiment of a rotational element, such as a drum in accordance with the present invention.

The correlations, as described above, are illustrated in FIG. 2 in an approximate manner for a rotational body according to FIG. 1 and are described hereinafter, using standard and/or commonly used symbols.

Figure 2:
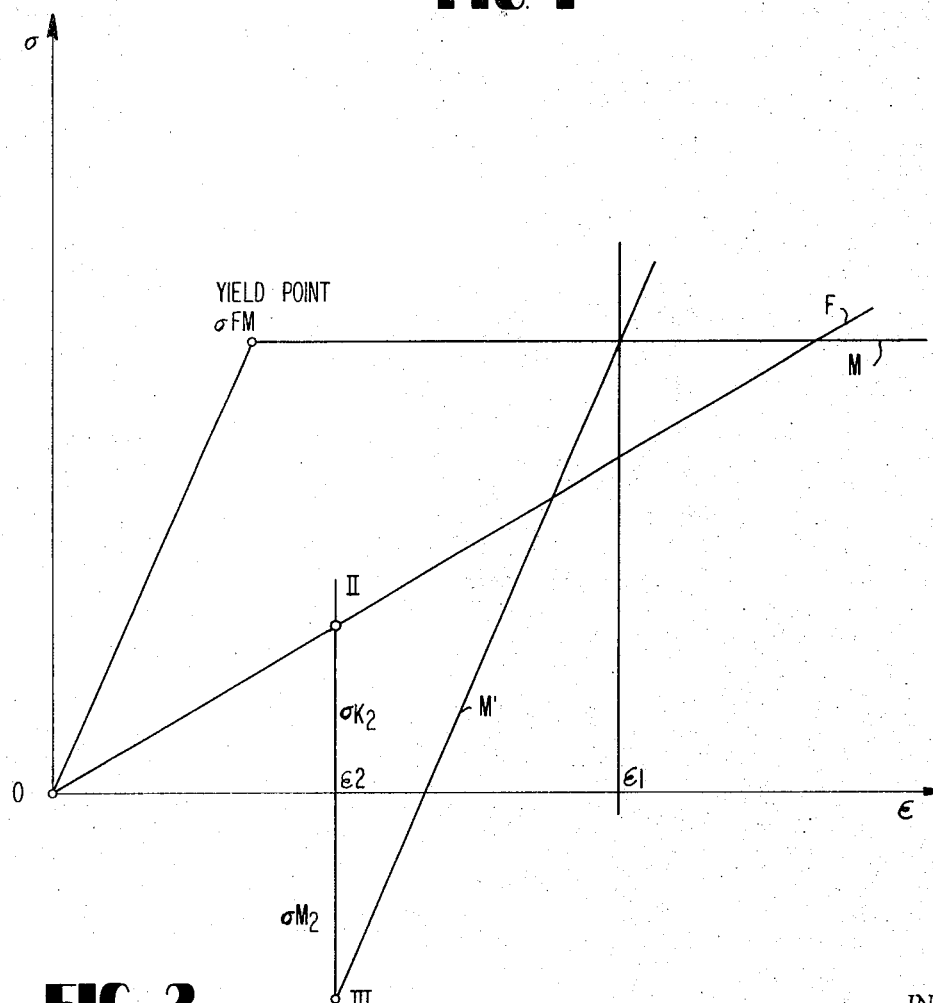
FIG. 2 is a stress-strain diagram for the material of the combined rotating element in accordance with the present invention.

The rotational body features a wall portion 1 made from metal and a wall portion 2 made from fiber-reinforced plastic material of any conventional type. FIG. 2 is a diagram of the one-dimensional stresses and strains for a typical metallic material (curve M) and for a typical fiber-reinforced plastic material (curve F) obtained by plotting stress $\sigma$ as ordinate vs strain $\epsilon$ as abscissa. The metal, e.g., mild steel, is assumed to have ideal plastic properties. After reaching the yield point for the metallic material and fiber reinforced plastic material designated $\sigma_{F,M}$ shown in FIG. 2, the curve $M = \sigma(\epsilon)$ bends over into a horizontal line; due to the small modulus of elasticity, curve F has considerably lesser slope than the curve section $0 - \sigma_{F,M}$.

Now, if a cylindrical rotor is rotated at speed $n$ in the described manner, it has an angular velocity of $\omega = \pi n/30$. The tangential stresses $\sigma_u$ thus generated will then be $\sigma_u = \sigma \cdot r^2 \cdot \omega^2$, where:

$\sigma_u$ = tangential stresses
$\rho$ = density
$r$ = radius of the cylinder
$\omega$ = angular velocity of the rotor.

The strains in a circumferential direction will be $\epsilon_u = \rho \cdot r^2 \cdot \omega^2/E$, where:

$\epsilon_u$ = circumferential strains
$\rho$ = density
$r$ = radius of the cylinder
$\omega$ = angular velocity of the rotor
$E$ = modulus of elasticity (Young's Modulus). If one follows once more the described cycle of speed increases with the aid of these simple equations, it will be recognized that different tangential strains and thus radial expansions will occur as a function of the ratio $\rho/E$. These correlations will hold true until the inner, metallic cylinder has reached its yield point. It may also happen that the radial expansion of the metallic cylinder is less than that of the GRP outer cylinder, thereby causing a temporary separation of the two cylinders. From a certain speed, the yield point of the inner metal cylinder will be exceeded. The increased centrifugal forces produced by an increased speed thus have to be absorbed by the GFP outer cylinder. The metal cylinder is now of course, in contact with the plastic cylinder at this stage. The radial deformations and circumferential strains of the two cylinders are now equal. Under the assumption that a given predetermined speed $n_1$ corresponds to a common circumferential strain $\epsilon_1$, and that the combined cylinder will be relieved from this speed, then the stress/strain correlation in the metal cylinder is described by curve $M'$ (Bauschinger effect). Since the plastic part was still loaded in the linear elastic range, the correlation between strains and stresses during rotational speed decrease will take place along the curve F. At zero speed, an internal inherent stress condition will exist which will lead to compressive stresses in the metal cylinder and to tensile stresses in the fiber-reinforced plastic cylinder. According to the thicknesses of the two cylinders and to their material parameters, a permanent elongation $\epsilon_2$ will remain in the combined cylinder. The tensile stresses in the plastic cylinder will then be $\sigma_{K2}$, and the corresponding compressive stresses in the metal cylinder $\sigma_{M2}$.

With a renewed load on the combined cylinder due to rotation, the tensile stresses in the plastic portion will rise, starting from point II, along curve F, while the corresponding stresses in the metal portion will rise, starting from point III, along curve $M'$. During this process, the compressive stresses in the metal are at first reduced and thereafter tensile stresses will develop.

As a result of the pre-stress, the behavior of the combined rotor will be basically different from that during its initial acceleration. The total radial expansion or growth will in the elastic as well as in the plastic case be proportional to the tangential strain in the cylinder, i.e., during initial rotation, the total expansion or growth of the combined cylinder will be proportional to the length $0-\epsilon_1$ where $\epsilon_1$ equals a common circumferential strain. During the second loading cycle, at the same speed, the radial expansion or growth now occurring will be proportional to the length $\epsilon_2 - \epsilon_1$. Thus, the permanently or plastically deformed combined rotor will behave like a metal rotor with a higher yield point.

Due to its lower overall density, however, the rotor will be capable of considerably higher circumferential speeds than would be possible with pure metal rotors.

The internal stress condition can be produced by means other than rotation. For example, it is possible by the application of internal pressure to produce the same internal stress condition. After the internal stress has been produced in the combined rotor, the latter will be identical to the one described in detail above.

While I have shown and described only one embodiment in accordance with the present invention, it is understood that the same is not limited thereto but is susceptible of numerous changes and modifications as known to a person skilled in the art. Thus, any metallic material may be used having the particular properties outlined above. Similarly any known resin type of plastic material, especially any known type of synthetic material reinforced with the type of material producing the described properties, may be used with the present invention. Consequently, I do not wish to be limited to the details shown and described herein but intend to cover all such changes and modifications as are within the scope of those skilled in the art.

What is claimed is:

1. Process for the manufacture of a rotor or shaft of low deformability, especially suitable for high peripheral speeds, comprising:

concentrically disposing a metallic cylinder of high specific modulus of elasticity on the inside of a fiber-reinforced plastic cylinder of low specific modulus of elasticity, prestressing said two cylinders by a first rotation of the rotor or shaft utilizing the Bauschinger effect occurring in metals, stressing the metallic cylinder beyond its yield point, and building up an internal stress condition so that, in the rest position, tangentially directed tensile stresses occur in the plastic cylinder and tangentially directed compressive stresses occur in the metallic cylinder, while tensile stresses occur in both cylinders at operating speed.

* * * * *